(12) United States Patent
Kim et al.

(10) Patent No.: US 7,801,074 B2
(45) Date of Patent: Sep. 21, 2010

(54) METHOD OF CONTROLLING PACKET SERVICE SETUP AND MOBILE COMMUNICATION SYSTEM

(75) Inventors: Sang-Kyu Kim, Yeongdungpo-Gu (KR); Young-Jun Lee, Seocho-Gu (KR)

(73) Assignee: Pantech&Curitel Communications, Inc., Seoul (KR)

( * ) Notice: Subject to any disclaimer, the term of this patent is extended or adjusted under 35 U.S.C. 154(b) by 526 days.

(21) Appl. No.: 11/132,400

(22) Filed: May 19, 2005

(65) Prior Publication Data

US 2006/0023663 A1    Feb. 2, 2006

(30) Foreign Application Priority Data

Jul. 28, 2004    (KR) .................... 10-2004-0059401

(51) Int. Cl.
*H04Q 7/00* (2006.01)
(52) U.S. Cl. .................. 370/329; 455/445; 455/425; 455/512; 455/220; 455/406; 455/437; 455/436; 455/450; 455/414.1; 455/566; 370/354; 370/352; 370/341; 370/231; 370/465; 370/328; 370/338; 370/335; 370/342
(58) Field of Classification Search ........... 370/329, 370/395.2, 354, 352, 252, 392, 389, 114.15, 370/331, 379, 465, 330, 341, 328, 231, 232, 370/338, 335, 342; 455/432.1, 445, 425, 455/512, 220, 561, 426.1, 406, 408, 437, 455/551, 436, 450, 414.1, 566; 379/88.17, 379/900, 114, 111, 114.01, 114.03, 114.06, 379/246, 230, 352, 114.2
See application file for complete search history.

(56) References Cited

U.S. PATENT DOCUMENTS

| | | | | |
|---|---|---|---|---|
| 5,303,297 | A | * | 4/1994 | Hillis .......................... 455/406 |
| 6,032,188 | A | * | 2/2000 | Mairs et al. ................. 709/234 |
| 6,104,929 | A | * | 8/2000 | Josse et al. .................. 455/445 |
| 6,216,006 | B1 | * | 4/2001 | Scholefield et al. ......... 455/450 |
| 6,385,451 | B1 | * | 5/2002 | Kalliokulju et al. ......... 455/437 |
| 6,496,690 | B1 | * | 12/2002 | Cobo et al. ................. 455/408 |
| 6,512,756 | B1 | * | 1/2003 | Mustajarvi et al. .......... 370/341 |
| 6,661,782 | B1 | * | 12/2003 | Mustajarvi et al. .......... 370/331 |
| 6,714,794 | B1 | * | 3/2004 | O'Carroll .................... 455/466 |

(Continued)

FOREIGN PATENT DOCUMENTS

WO    2004-030289    4/2004

*Primary Examiner*—Rafael Pérez-Gutiérrez
*Assistant Examiner*—Joseph Arevalo
(74) *Attorney, Agent, or Firm*—H.C. Park & Associates, PLC

(57) ABSTRACT

Disclosed are a method of controlling packet service setup and a mobile communication system. The method includes the steps of: transmitting a packet service request message containing a requested QoS to a packet service node by a mobile communication terminal; transmitting to the mobile communication terminal a packet service request response message including an assigned QoS determined in consideration of the requested QoS and network resources contained in the message received by the packet service node; comparing one or more parameter values among parameters contained in the assigned QoS contained in the packet service request response message from a mobile communication network with corresponding one or more parameter values among parameters contained in the QoS requested by the mobile communication terminal; and transmitting a packet service cancel request message if a difference between the parameter values is greater than or equal to a preset value.

9 Claims, 6 Drawing Sheets

U.S. PATENT DOCUMENTS

| | | | |
|---|---|---|---|
| 6,728,365 B1* | 4/2004 | Li et al. | 379/329 |
| 7,023,825 B1* | 4/2006 | Haumont et al. | 370/338 |
| 7,054,268 B1* | 5/2006 | Parantainen et al. | 370/231 |
| 7,085,579 B2* | 8/2006 | Mizutani et al. | 455/512 |
| 7,324,483 B2* | 1/2008 | Lee | 370/335 |
| 2001/0031634 A1* | 10/2001 | Mizutani et al. | 455/425 |
| 2002/0032800 A1* | 3/2002 | Puuskari et al. | 709/246 |
| 2002/0064149 A1* | 5/2002 | Elliott et al. | 370/352 |
| 2002/0065067 A1* | 5/2002 | Khare et al. | 455/414 |
| 2002/0097709 A1* | 7/2002 | Haumont et al. | 370/352 |
| 2002/0131449 A1* | 9/2002 | Sugisaki | 370/465 |
| 2003/0002480 A1* | 1/2003 | Giustina et al. | 370/352 |
| 2003/0114158 A1* | 6/2003 | Soderbacka et al. | 455/436 |
| 2003/0117956 A1* | 6/2003 | Lee | 370/232 |
| 2003/0137976 A1* | 7/2003 | Zhu et al. | 370/354 |
| 2003/0152048 A1* | 8/2003 | Soininen et al. | 370/328 |
| 2003/0153309 A1* | 8/2003 | Bjelland et al. | 455/432 |
| 2003/0156578 A1* | 8/2003 | Bergenlid et al. | 370/352 |
| 2004/0013089 A1* | 1/2004 | Taneja et al. | 370/235 |
| 2004/0160922 A1* | 8/2004 | Nanda et al. | 370/335 |
| 2004/0259545 A1* | 12/2004 | Morita | 455/435.1 |
| 2005/0043032 A1* | 2/2005 | Choi | 455/450 |
| 2005/0054353 A1* | 3/2005 | Mademann | 455/458 |
| 2005/0210505 A1* | 9/2005 | Chiu et al. | 725/43 |
| 2006/0077965 A1* | 4/2006 | Garcia-Martin et al. | 370/352 |
| 2006/0165027 A1* | 7/2006 | Heden | 370/328 |
| 2006/0221903 A1* | 10/2006 | Kauranen et al. | 370/331 |
| 2006/0291416 A1* | 12/2006 | Rexhepi et al. | 370/331 |
| 2007/0153793 A1* | 7/2007 | Jiang | 370/390 |
| 2007/0237134 A1* | 10/2007 | Bergenlid et al. | 370/352 |
| 2008/0020775 A1* | 1/2008 | Willars | 455/445 |

* cited by examiner

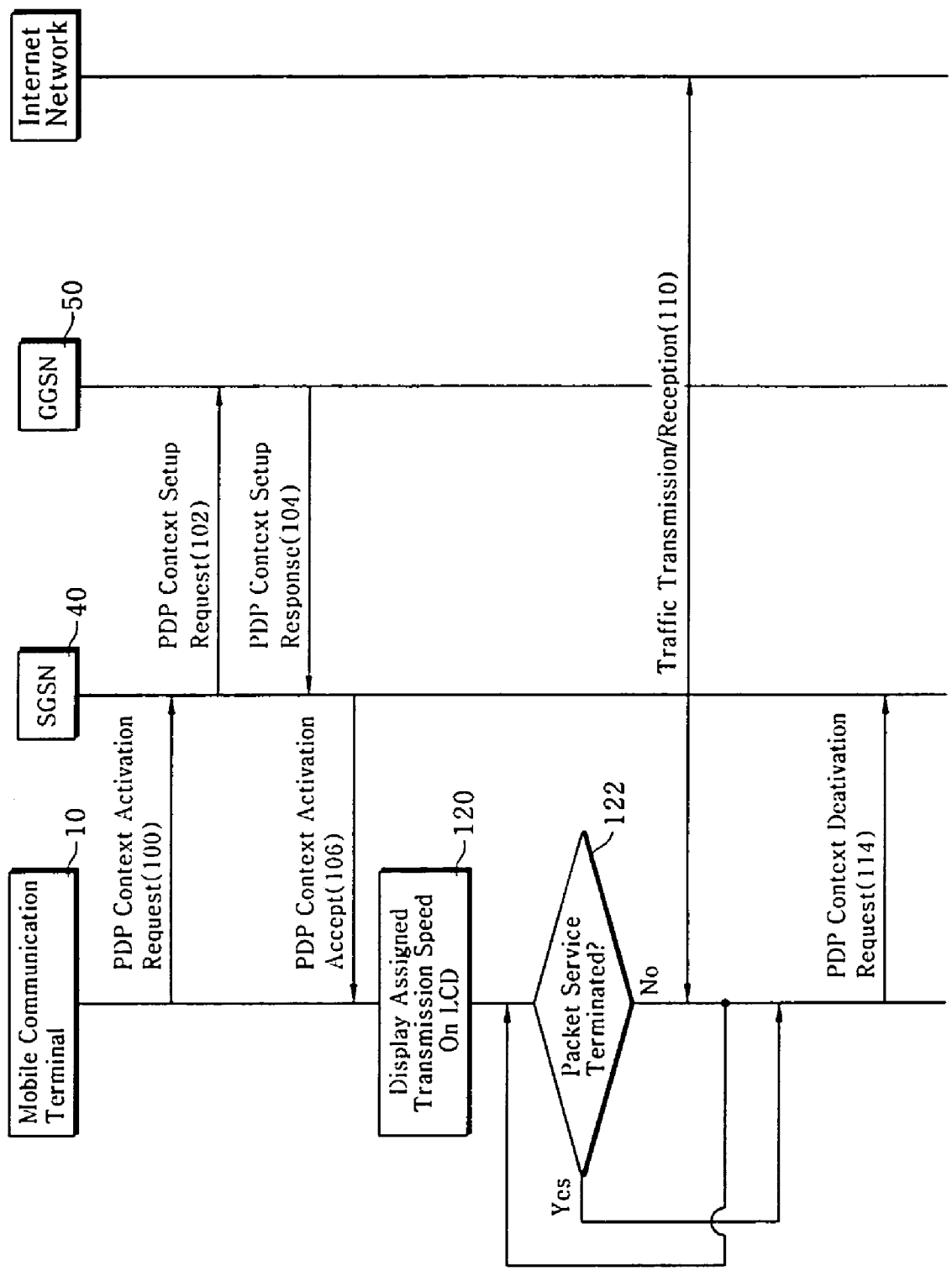

FIG.4

| Quality of Service IEI |||
|---|---|---|
| Length of Quality of Service IE |||
| 0  0<br>Spare | Delay<br>Class | Reliability<br>Class |
| Peak<br>Throughput | 0<br>Spare | Precedence<br>Class |
| 0  0  0<br>Spare | Mean<br>Throughput ||
| Traffic Class | Delivery Order | Delivery of Erroneous<br>SDU |
| Maximum SDU Size |||
| Maximum Bit Rate for Uplink |||
| Maximum Bit Rate for Downlink |||
| Residual BER | SDU Error Ratio ||
| Transfer Delay | Traffic Handling<br>Priority ||
| Guaranteed Bit Rate for Uplink |||
| Guaranteed Bit Rate for Downlink |||

METHOD OF CONTROLLING PACKET SERVICE SETUP AND MOBILE COMMUNICATION SYSTEM

BACKGROUND OF THE INVENTION

This application claims the priority of Korean Patent Application No. 2004-59401, filed on Jul. 28, 2004, in the Korean Intellectual Property Office, the disclosure of which is incorporated herein in its entirety by reference.

FIELD OF THE INVENTION

The present invention relates to a mobile communication terminal and, more particularly, to a technology related to a packet service.

DESCRIPTION OF RELATED ART

Mobile communication terminals basically provide a wireless communication function using a circuit switching system. Recently, as rapid development has been made in such the mobile communication technology field, current mobile communication terminals can provide a service of a packet switching system through a general packet radio service (GPRS) network.

The GPRS can add voiceless information to information that is transmitted and received through a wireless communication system, and makes it possible to interconnect between a GPRS network and the existing Internet for the first time. Accordingly, the mobile communication terminal can make use of the Internet through the GPRS network, so that it can provide services such as Web browsing, chatting, E-mail, and telnet, which are currently provided via wired Internet connections.

When the mobile communication terminal makes use of the packet service described above, it is provided with a packet switching path for the packet service from the GPRS network. Also, the mobile communication terminal is assigned a quality of service (QoS) for using the packet switching path from the GPRS network. For reference, the QoS refers to a performance unit indicating transmission quality, transmission rate and error rate of a transmission system.

The mobile communication terminal can make use of a packet service, i.e., it can transmit/receive packet data, through the packet switching path provided from the GPRS network. However, when a user of the mobile communication terminal makes use of the packet service, he or she cannot identify the QoS assigned to the mobile communication terminal, particularly, a transmission speed among parameters of the QoS, even when the transmission speed does not reach a user desired level.

When the user determines that the transmission speed is too low due to a service delay while using the packet service, he or she may compulsorily terminate the service. For example, when the user accesses the Internet wirelessly and downloads desired content, the user may cancel the download process due to an intolerably low download speed thereof. Also, there occurs a problem in that the user is billed for the packet service regardless of the fact that the user terminated the download before completion.

SUMMARY OF THE INVENTION

The present invention provides a mobile communication terminal capable of controlling the use of packet service depending on a quality of service assigned when using the packet service.

In accordance with an aspect of the present invention, there is provided a method of controlling packet service setup, the method comprising the steps of: transmitting a packet service request message containing a requested QoS (quality of service) to a packet service node by a mobile communication terminal; transmitting to the mobile communication terminal a packet service request response message including an assigned QoS determined in consideration of the requested QoS and network resources contained in the message received by the packet service node; comparing one or more parameter values among parameters contained in the assigned QoS contained in the packet service request response message from a mobile communication network with corresponding one or more parameter values among parameters contained in the QoS requested by the mobile communication terminal; and transmitting a packet service cancel request message if a difference between the parameter values is greater than or equal to a preset value.

In accordance with another aspect of the present invention, there is provided a mobile communication system, comprising: at least one packet service node for receiving a packet service request message from a mobile communication terminal, determining an assigned QoS in consideration of a requested QoS and available network resources contained in the packet service request message, and transmitting a packet service request response message containing the assigned QoS to the mobile communication terminal; and at least one mobile communication terminal for transmitting the packet service request message to the packet service node, comparing one or more parameter values among the assigned QoS parameters contained in the packet service request response message from the packet service node with corresponding one or more parameter values among the requested QoS parameters, and transmitting a packet service cancel request message if a difference between the corresponding two QoS parameter values is greater than or equal to a preset value.

The packet service cancel request message may be transmitted according to a user's command if the difference between the corresponding two QoS parameter values is greater than or equal to a preset value.

The compared QoS parameter may be a transmission speed.

The transmission speed may be a downlink transmission speed.

The packet service node may be an SGSN.

The packet service request message may be a PDP Context activation request message.

The packet service request response message may be a PDP Context activation accept message.

The packet service cancel request message may be a PDP Context activation cancel message.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a flowchart showing a method of controlling packet service setup in accordance with another embodiment of the present invention;

FIG. 4 is a view showing QoS parameters;

DETAILED DESCRIPTION OF THE INVENTION

Exemplary embodiments of the present invention will now be described below in more detail with reference to the accompanying drawings. Like numerals refer to like elements throughout the specification.

Figure 1:
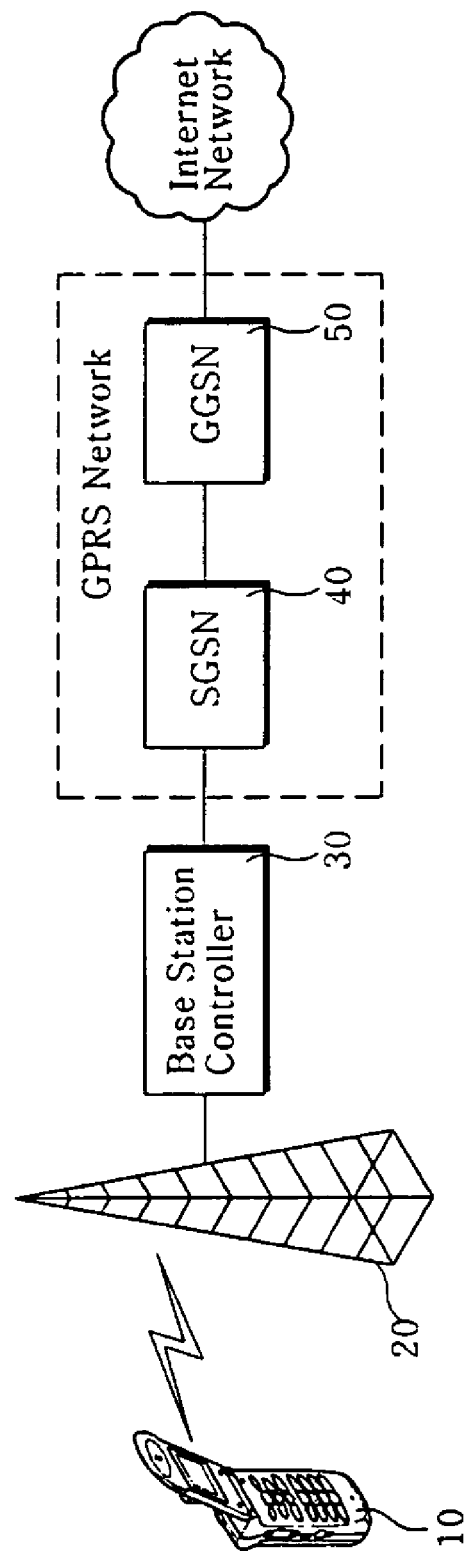
FIG. 1 is a schematic view showing a construction of a GPRS network serving as a packet switching network.

FIG. 1 is a schematic view showing a GPRS network serving as a packet switching network. The GPRS network includes two nodes, an SGSN (Serving GPRS Support Node) 40 and a GGSN (Gateway GPRS Support Node) 50. The SGSN 40 is a node that performs position control and access control of the mobile communication terminal 10, and transmits and receives a packet to and from a mobile communication terminal in a service area. Further, the GGSN 50 is connected to a corresponding SGSN 40 through an assigned tunnel, and serves as a gateway to another network (e.g., Internet).

Tunneling assignment between the corresponding SGSN 40 and GGSN 50 is performed by setting a packet data protocol context (PDP Context). The PDP Context refers to a network protocol that an external packet data network uses to communicate with the GPRS network. PDP Context setup is a preparation procedure to transmit a packet in the GPRS network, where the packet switching path is set. That is, the procedure to set a packet switching path in the GPRS network can be an operational procedure to set the PDP Context. As the PDP Context is set, a tunnel is assigned between the corresponding SGSN 40 and GGSN 50. The set PDP Context is managed and synchronized by the mobile communication terminal 10, the SGSN 40 and the GGSN 50.

Accordingly, the mobile communication terminal 10 can perform a packet transmitting/receiving process through a packet switching path that is connected to the base station 20, the BTS system controller 30 for controlling a plurality of base stations, the SGSN 40 and the GGSN 50.

Figure 2:
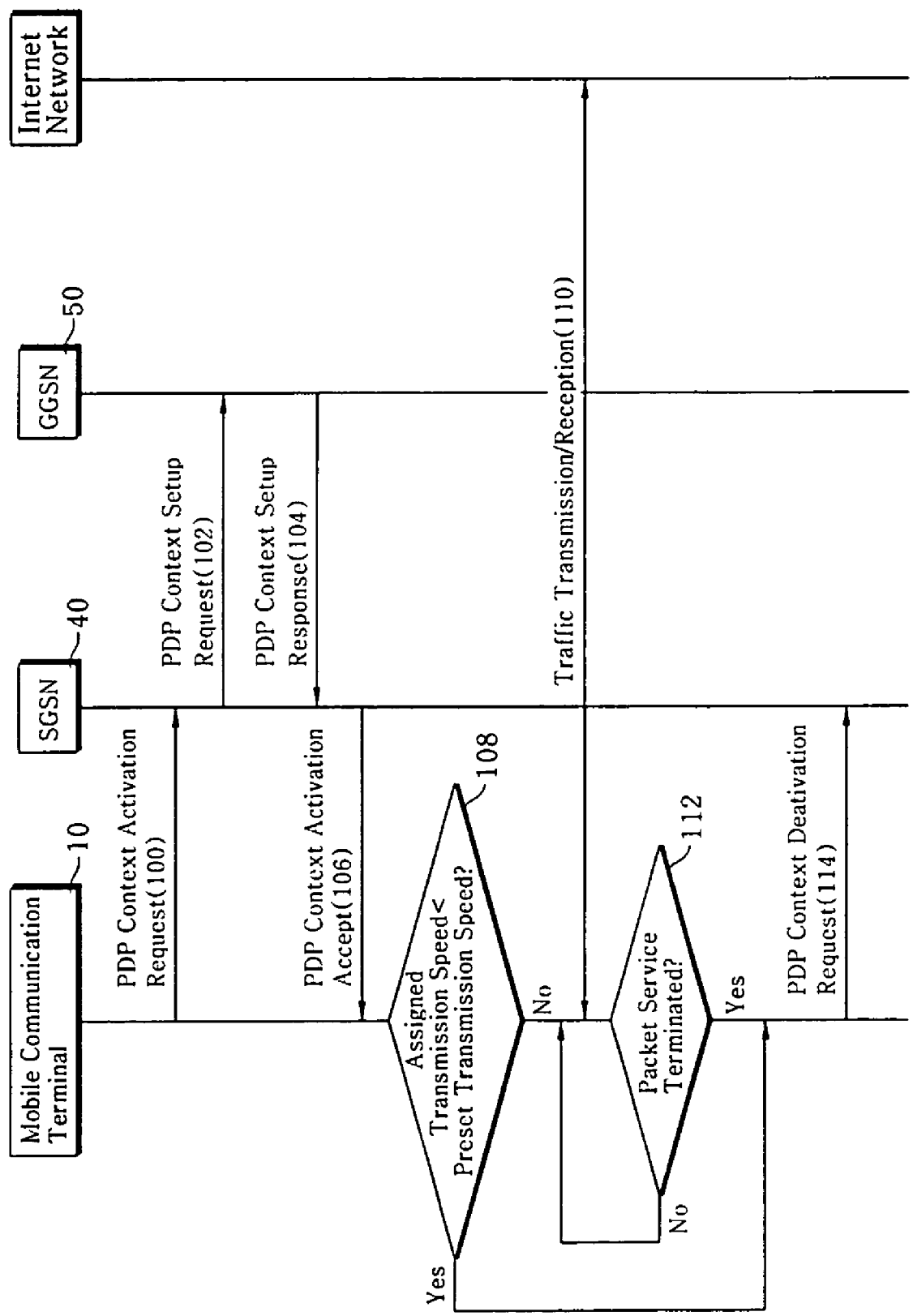
FIG. 2 is a flowchart showing a method of controlling packet service setup in accordance with a preferred embodiment of the present invention.

FIG. 2 is a flowchart showing a method of controlling packet service setup in accordance with an embodiment of the present invention. First, to provide the packet service to the mobile communication terminal 10, a packet switching path setup, that is, a tunnel assignment between the SGSN 40 and the GGSN 50 which are packet service nodes should be performed (PDP Context setup) as described above. The PDP Context setup is performed using GTP-C (GTP Control plane) of the GTP (GPRS Tunnel Protocol) as described below.

The mobile communication terminal 10 transmits a PDP Context activation request message (Activate PDP Context Request), which is a packet service request message, to the SGSN 40 (step 100). The SGSN 40 receives the PDP Context activation request message transmitted from the mobile communication terminal 10 and then transmits the PDP Context setup request message (Create PDP Context Request) to the GGSN 50 in order to set up a tunnel to the GGSN 50 (step 102). The PDP Context setup request message includes TEID (Tunneling Endpoint Identifier) in order that the GGSN 50 may identify user traffic of the corresponding SGSN 40.

The GGSN 50 receives the PDP Context setup request message from the SGSN 40 and stores the TEID of the SGSN 40. Next, the GGSN 50 transmits a PDP Context setup response message (Create PDP Context Response) to the SGSN 40 (step 104). The PDP Context setup response message contains the TEID in order that the SGSN 40 may identify user traffic of the GGSN 50 and then is transmitted. The SGSN 40 receives the PDP Context setup response message and stores the TEID of the GGSN 50.

When the PDP Context setup is completed through the tunnel assignment procedure as described above, it is possible to perform traffic transmitting/receiving between the SGSN 40 and the GGSN 50. At this time, the user traffic transmitted/received between the SGSN 40 and GGSN 50 is processed according to the GTP-U (GPRS User plane) protocol, which serves as the traffic protocol. Since the user traffic processing technology according to the GTP-U protocol is well known in the art, a detailed description thereof is omitted.

After the PDP Context is set, the SGSN 40 transmits the PDP Context activation accept message (Activate PDP Context Accept), which is a packet service request response message, to the mobile communication terminal 10 (step 106). The mobile communication terminal 10 receives the PDP Context activation accept message, and checks the assigned QoS parameter among information elements contained in the PDP Context.

FIG. 4 is a view showing QoS parameters. The QoS includes various parameters indicating quality levels for the packet service. 'Maximum bit rate for uplink', 'Maximum bit rate for downlink', 'Guaranteed bit rate for uplink' and 'Guaranteed bit rate for downlink' are parameters related to transmission speed.

'Maximum bit rate for uplink' and 'Maximum bit rate for downlink' indicate assigned maximum transmission speeds, where the 'Maximum bit rate for uplink' indicates the maximum bit rate for uplink transmitted within a given time, and the 'Maximum bit rate for downlink' indicates the maximum bit rate for downlink transmitted within a given time. In addition, 'Guaranteed bit rate for uplink' and 'Guaranteed bit rate for downlink' indicate a guaranteed transmission speed, where the 'Guaranteed bit rate for uplink' indicates the minimum guaranteed bit rate for uplink and 'Guaranteed bit rate for downlink' indicates the minimum guaranteed bit rate for downlink.

The mobile communication terminal compares one or more parameter values included in the assigned QoS with the parameter value stored in advance. Preferably, between the maximum transmission speed and the guaranteed transmission speed included in the assigned QoS, the mobile communication terminal compares the maximum transmission speed with a preset transmission speed (step 108). In accordance with an embodiment, the mobile communication terminal 10 compares the 'Maximum bit rate for uplink' or 'Maximum bit rate for downlink' with preset uplink transmission speed or downlink transmission speed. In accordance with another embodiment, the mobile communication terminal 10 can compare both of 'Maximum bit rate for uplink' and 'Maximum bit rate for downlink' with the preset uplink transmission speed and downlink transmission speed.

If the transmission speed included in the QoS, i.e., the assigned transmission speed, is lower than the preset transmission speed as a result of the comparison, the mobile communication terminal transmits a PDP Context activation cancel message (that is, deactivation request message), which is a packet service cancel request message, to the SGSN 40 (step 114). For example, if the preset transmission speed in the mobile communication terminal 10 is 32 Kbps and the assigned transmission speed is 16 Kbps, the mobile communication terminal 10 transmits the PDP Context activation cancel message to the SGSN 40. The SGSN 40 performs a procedure for the assigned tunnel cancel process with the GGSN 50. Such a procedure is well known in the art, and a detailed description thereof is thus omitted.

Figure 5A:
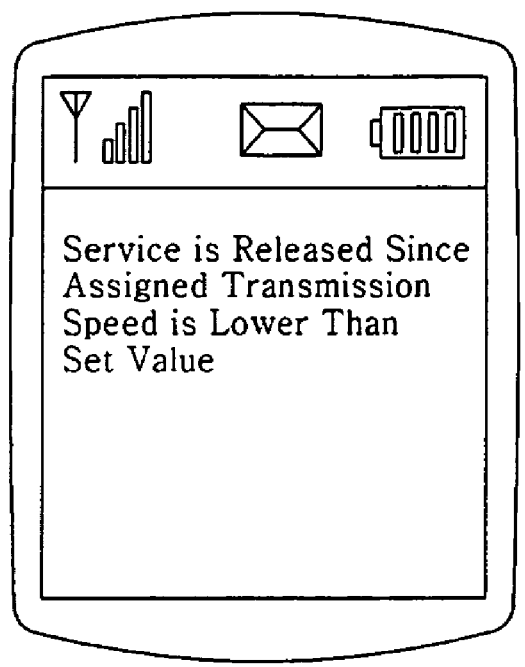
FIG. 5A is a view showing an example of a screen displayed in accordance with the method of the present invention.

Preferably, when the assigned transmission speed is lower than the preset transmission speed, the mobile communication terminal 10 displays packet service release information on, for example, a liquid crystal display (LCD), and informs the user of this fact before transmitting the PDP Context activation cancel message to the SGSN 40. FIG. 5A is a view showing an example of service release information displayed on the LCD of the mobile communication terminal. As shown in FIG. 5A, when the mobile communication terminal 10 automatically terminates the packet service due to the fact that the assigned transmission speed is lower than the preset speed, it displays a pop-up window on the LCD for 1 or 2 seconds. Next, the mobile communication terminal 10 transmits the PDP Context activation cancel message to the SGSN 40 and releases the packet service.

Accordingly, since the mobile communication terminal automatically performs the packet service use release in the case where the transmission speed assigned when using the packet service is lower than the preset transmission speed, the problems of user inconvenience and additional costs levied against the user, which occur when the user uses the packet service at a low transmission speed, can be solved.

In step 108, if the assigned transmission speed is greater than or equal to the preset transmission speed, the mobile communication terminal 10 is connected to the Internet network through the set packet switching path to process traffic transmission/reception (step 110). Accordingly, the mobile communication terminal can gain access to the Internet and then download desired content and the like.

If there is a command for packet service termination according to a user's key operation (step 112), the mobile communication terminal 10 transmits a PDP Context activation cancel message to the SGSN 40 as in step 114. Without the command, the mobile communication terminal 10 continues to process the traffic transmitting/receiving process as in step 110.

According to another feature of the present invention, the mobile communication terminal 10 transmits the PDP Context activation cancel message to the SGSN 40 according to a user's command in the case where the transmission speed included in the assigned QoS is lower than the preset transmission speed.

Figure 5B:
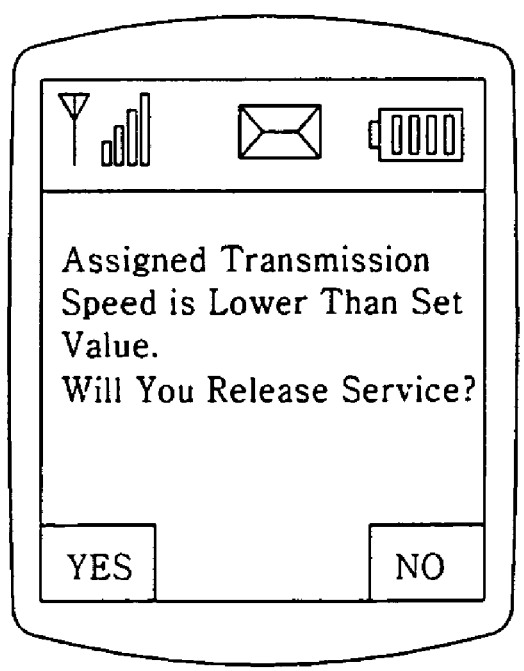
FIG. 5B is a view showing another example of a screen displayed in accordance with the method of the present invention.

In the step 108, if the transmission speed included in the QoS, that is, the assigned transmission speed is lower than the preset transmission speed, the mobile communication terminal 10 preferably informs the user of this fact through the LCD as shown in FIG. 5B. The user identifies that the assigned transmission speed is lower than the preset transmission speed through the LCD, and determines whether or not the packet service use is released. If the user selects 'YES' through the key operation, the mobile communication terminal releases the packet service by transmitting the PDP Context activation cancel message to the SGSN 40 as in step 114.

However, if the user selects 'NO' through the key operation, the mobile communication terminal 10 does not transmit the PDP Context activation cancel message to the SGSN 40 even though the assigned transmission speed is lower than the preset transmission speed. This is because the user may need to use the packet service even though the assigned transmission speed is lower than the preset transmission speed. Accordingly, the mobile communication terminal 10 can be connected to the Internet network to transmit the traffic as in step 110.

According to another feature of the present invention, the transmission speed described above is a transmission speed for the downlink. Generally, since a user of the mobile communication terminal makes use of the packet service to download various content such as a game, the transmission speed for the downlink is a critical factor to the user. Accordingly, the mobile communication terminal 10 compares the assigned downlink transmission speed, that is, 'Maximum bit rate for downlink' with the preset transmission speed, and controls packet service setup.

FIG. 3 is a flowchart showing a method of controlling packet service setup in accordance with another embodiment of the present invention. Hereinafter, in describing the present invention with reference to FIG. 3, a description already mentioned in FIG. 2 is omitted. If the mobile communication terminal 10 receives the PDP Context activation accept message from the SGSN 40 in step 106, it displays the transmission speed included in the QoS parameter among PDP Context information elements (see FIG. 4), i.e., the assigned transmission speed, on the LCD.

Figure 5C:
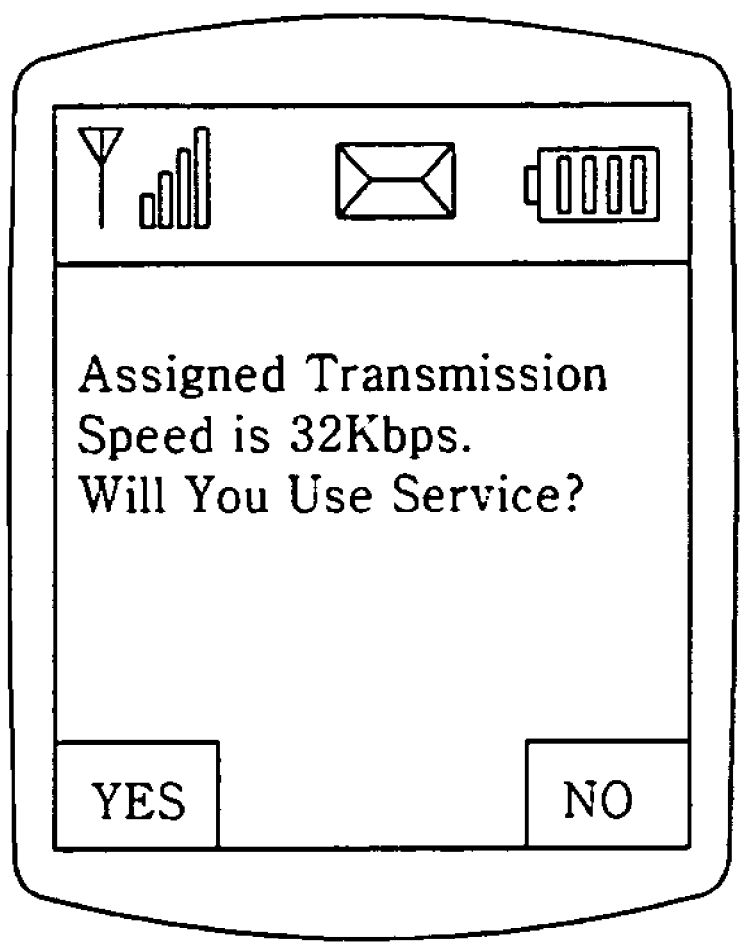
FIG. 5C is a view showing another example of a screen displayed in accordance with the method of the present invention.

FIG. 5C is a view showing an example where a transmission speed assigned by the mobile communication terminal 10 for the packet service use is displayed on the LCD. After the user of the mobile communication terminal identifies the transmission speed assigned for the packet service use, he or she determines whether or not to use the packet service and selects 'YES' or 'NO'.

If the user selects 'NO', that is, the user commands the packet service to be terminated, the mobile communication terminal 10 transmits the PDP Context activation cancel (deactivation request) message to the SGSN 40 as in step 114, thereby releasing the packet service. If the user commands the packet service to be used by selecting 'YES', the mobile communication terminal 10 can be connected to the Internet network and perform the traffic transmitting/receiving process as in step 110.

The mobile communication system based on the SGSN and the mobile communication terminal controls the packet service setup through signal processing. The mobile communication system can be described in the same manner with reference to FIGS. 1 and 2 as described above, and a detailed description thereof will thus omitted.

As described above, since the mobile communication terminal in accordance with the present invention determines whether or not to use the packet service depending on the transmission speed assigned when using the packet service, it is possible to solve problems of user inconvenience and additional costs levied against the user, which may occur when the user uses the packet service at a low transmission speed.

While the present invention has been described with reference to exemplary embodiments thereof, it will be understood by those skilled in the art that various changes in form and detail may be made therein without departing from the scope of the present invention as defined by the following claims.

What is claimed is:

1. A method of controlling packet service setup by quality of service (QoS) in a mobile communication terminal, comprising:
   transmitting to a Serving GPRS Support Node (SGSN) a packet data protocol context activation request message that is required for packet exchange path setup;
   receiving a packet data protocol context activation accept message from the SGSN;
   comparing a transmission speed, which is contained in an assigned QoS parameter of information contained in the packet data protocol context activation accept message, with a preset transmission speed; and
   transmitting a packet data protocol context activation cancel message to the SGSN to cancel the packet exchange path setup by a user's command, if the transmission speed contained in the assigned QoS parameter is lower than the preset transmission speed.

2. The method of claim 1, wherein the transmission speed is a downlink transmission speed.

3. A method of controlling packet service setup by quality of service (QoS) in a mobile communication terminal, comprising:
   transmitting to a Serving GPRS Support Node (SGSN) a packet data protocol context activation request message that is required for packet exchange path setup;
   receiving a packet data protocol context activation accept message from the SGSN;
   displaying a transmission speed that is contained in an assigned QoS parameter of information contained in the packet data protocol context activation accept message; and
   transmitting a packet data protocol context activation cancel message to the SGSN to cancel the packet exchange path setup by a user's command.

4. The method of claim 3, wherein the transmission speed is a downlink transmission speed.

5. A mobile communication system comprising:
   a packet service node; and
   at least one mobile communication terminal;
   wherein the packet service node receives a packet service request message from the mobile communication terminal, determines a quality of service (QoS) to be assigned taking account of available network resources and a requested QoS contained in the packet service request message, and transmits to the mobile communication terminal a packet service request response message containing the assigned QOS; and
   wherein the mobile communication terminal transmits a packet service request message to the packet service node, receives the packet service request response message from the packet service node, compares a transmission speed parameter of QoS parameters contained in the packet service request response message with a preset transmission speed, and transmits a packet service cancel request message to the packet service node to cancel the packet exchange path setup by a user's command, if the transmission speed contained in the packet service request response message is lower than the preset transmission speed.

6. The mobile communication system of claim 5, wherein the packet service node is a Serving GPRS Support Node (SGSN).

7. The mobile communication system of claim 6, wherein the packet service request message is a packet data protocol context activation request message.

8. The mobile communication system of claim 7, wherein the packet service request response message is a packet data protocol context activation accept message.

9. The mobile communication system of claim 8, wherein the packet service cancel request message is a packet data protocol context activation cancel message.

* * * * *